US005586032A

United States Patent [19]
Kallenbach et al.

[11] Patent Number: 5,586,032
[45] Date of Patent: Dec. 17, 1996

[54] SYSTEM FOR CONTROLLING A VEHICLE UNDERCARRIAGE BASED ON ROAD SAFETY, TRAVEL COMFORT AND STANDARD MODES OF OPERATION

[75] Inventors: Rainer Kallenbach, Waiblingen-Neustadt; Stefan Otterbein, Stuttgart, both of Germany

[73] Assignee: Robert Bosch GmbH, Stuttgart, Germany

[21] Appl. No.: 332,425

[22] Filed: Oct. 31, 1994

Related U.S. Application Data

[63] Continuation of Ser. No. 880,531, May 8, 1992, abandoned.

[30] Foreign Application Priority Data

May 11, 1991 [DE] Germany .......................... 41 15 481.9

[51] Int. Cl.⁶ .................................................. G06F 7/70
[52] U.S. Cl. .................... 364/424.055; 280/707; 280/688; 280/807; 180/197
[58] Field of Search ................ 364/424.05, 424.01, 364/426.02, 426.01, 141, 146, 162, 186, 189; 280/707, 688, 661, 708, 807; 188/299, 313, 318; 180/197, 133, 79.1, 282, 268, 273

[56] References Cited

U.S. PATENT DOCUMENTS

| Re. 32,063 | 1/1986 | Schultz ................................. 180/268 |
| 4,359,129 | 11/1982 | Schultz ................................. 180/268 |
| 4,697,237 | 9/1987 | Tanaka et al. .................... 364/424.05 |
| 4,712,807 | 12/1987 | Kurosawa ............................ 280/707 |
| 4,749,210 | 6/1988 | Sugasawa ............................ 280/707 |
| 4,886,291 | 12/1989 | Okomoto ............................ 280/707 |
| 4,922,427 | 5/1990 | Yokote et al. .................... 364/424.05 |
| 4,966,394 | 10/1990 | Thomas et al. ..................... 280/707 |
| 4,970,645 | 11/1990 | Adachi et al. .................... 364/424.05 |
| 4,986,393 | 1/1991 | Preukschat et al. .................... 188/299 |
| 5,041,977 | 8/1991 | Kawabata ............................ 364/424.05 |
| 5,058,017 | 10/1991 | Adachi et al. .................... 364/424.05 |
| 5,062,658 | 11/1991 | Majeed ............................ 364/424.05 |
| 5,071,157 | 12/1991 | Majeed ............................ 364/424.05 |
| 5,074,569 | 12/1991 | Kawabata ............................ 364/424.05 |
| 5,127,667 | 7/1992 | Okuda et al. ..................... 364/424.05 |
| 5,138,554 | 8/1992 | Wada ............................ 364/424.05 |
| 5,172,929 | 12/1992 | Butsuen et al. ........................ 280/707 |
| 5,175,687 | 12/1992 | Tsutsumi et al. .................. 364/424.05 |
| 5,267,161 | 11/1993 | Kallenbach et al. ................ 364/424.01 |
| 5,303,155 | 4/1994 | Kallenbach et al. ................ 364/424.01 |
| 5,324,067 | 6/1994 | Kallenbach et al. .................... 280/707 |
| 5,367,459 | 11/1994 | Shtarkman et al. ................ 364/424.05 |
| 5,369,582 | 11/1994 | Gorny et al. ........................ 364/424.05 |

FOREIGN PATENT DOCUMENTS

| 3827737 | 9/1989 | Germany . |
| 4039629 | 9/1991 | Germany . |

OTHER PUBLICATIONS

Vehicle System Dnyamics 11 (1982), pp. 31–42.

*Primary Examiner*—Kevin J. Teska
*Assistant Examiner*—Jacques Louis-Jacques
*Attorney, Agent, or Firm*—Baker & Daniels

[57] ABSTRACT

A system for the generation of signals for control or regulation of a passenger car and/or truck undercarriage controllable or regulable in its sequences of movement, where a three-step operation is provided. In a safety mode, particular allowance is made for road safety, and in a comfort mode for travel comfort. Moreover, a predetermined undercarriage setting is selected in a standard mode. These selections are based on the movements determined between the wheels and the vehicle superstructure, such as spring deflection movements. Furthermore, based on the determined spring deflection movements, the actual value P of the wheel load fluctuations and the movements of the vehicle superstructure are inventionally determined. By query of certain criteria it is determined whether the undercarriage, controllable or regulable in its sequences of movement, will be adjusted in view of minimizing the wheel load fluctuations (safety mode) or in view of minimizing the superstructure movements (comfort mode) or whether a predetermined, specifically soft undercarriage setting will be selected (standard mode).

10 Claims, 10 Drawing Sheets

1

SYSTEM FOR CONTROLLING A VEHICLE UNDERCARRIAGE BASED ON ROAD SAFETY, TRAVEL COMFORT AND STANDARD MODES OF OPERATION

This is a continuation of application Ser. No. 07/880,531, filed May 8, 1992 now abandoned.

BACKGROUND OF THE INVENTION

The present invention relates to suspension systems and, more particularly, to shock absorber systems for motor vehicles.

Essential in the design of the undercarriage of a motor vehicle is an efficient spring and/or shock absorber system. The shock absorber system should, on one hand, make allowance for road safety while, on the other hand afford the passengers or a shock-sensitive cargo of the vehicle maximally high travel comfort. From the vantage point of the spring and/or shock absorber system, these are conflicting objectives. High travel comfort can be achieved through a maximally soft undercarriage adjustment, whereas with regard to high road safety a maximally hard undercarriage adjustment is desirable.

To resolve this conflict in objectives, a changeover is made from passive undercarriages, which for the most are so far still used, to controllable or active undercarriages. Depending on the predicted usage of the vehicle, the passive undercarriage is configured in its installation either hard ("sporty") or soft ("comfortable"). With these passive systems it is not possible to influence the undercarriage characteristic during the travel operation. In the case of active undercarriages, in contrast, the characteristic of the spring and/or shock absorber system can be influenced during the travel operation contingent upon the state of travel.

In DE-OS 38 27 737, the aforementioned conflict in objectives between road safety and travel comfort is solved in that, whenever road safety permits, a soft undercarriage adjustment provides for high travel comfort. But, if the state of travel of the vehicle is in a more critical range, a harder undercarriage adjustment is chosen. Utilized as evaluation criterion for road safety are wheel load fluctuations during the operation of travel. Wheel load fluctuation is understood as the deviation of the wheel load (normal force between tire and road) from its static value. However, wheel load fluctuation is accessible to direct measurement only with great difficulty, since transducers would need to be arranged between the wheel, or tire, and the road. Measuring the spring travel, in contrast, is relatively simple and can be cost-effectively realized. Spring travel is designated as the shift of the superstructure relative to the wheel. In DE-OS 38 27 737, for example, the spring travel is measured as a substitute variable for the wheel load fluctuation. From these measured values, the sliding effective value and the sliding average value for the substitute variable and its difference are formed. Once this difference has been compared with a predetermined set value, exceeding this predetermined set value triggers an electrical display and/or control signal for control/regulation of the undercarriage by which the latter is set to a harder characteristic.

But a system such as described in DE-OS 38 27 737 provides only coarse and incomplete information on whether the momentary state of travel of the vehicle is critical in terms of safety. Beyond that, an optimal minimization of the wheel load fluctuations is not possible through this system.

German patent application P 41 07 090.9 which is the equivalent of U.S. patent application Ser. No. 07/679,297, filed Apr. 2, 1991 describes a system by which, while enabling an optimal minimization of the wheel load fluctuations, increasing the travel comfort in travel situations that are not critical in terms of safety cannot be optimally solved.

An undercarriage adjustment for comfort can be accomplished, though, in that the adjustable undercarriage is adjusted maximally soft, i.e., the adjustable shock absorbers exercise a slight damping. But a far more efficient control or regulation of the undercarriage, in view of the movements of the vehicle superstructure that determine travel comfort for example, can be accomplished through a so-called "skyhook regulation" such as described in DE-OS 39 18 735.7 and DE-OS 37 38 284.

With the so-called skyhook regulation, the superstructure movements are reduced so as to bring about an improvement of the travel comfort, whereas the road safety is not directly increased. Generally known in undercarriage control, this concept of regulation is based on the model concept of a shock absorber system which attaches to the mass of the vehicle superstructure and is connected to an inertial fix point (skyhook). Such an inertial shock absorber suspension system, not being directly realizable in practice, is, by way of substitution, appropriately activated between the vehicle superstructure and the wheel units.

From a number of publications (Crolla, D. A., Aboul Nour, A.M.A., Proceedings of the Institution of Mechanical Engineers, International Conference of Advanced Suspension, 22–25 Oct. 1988, London or Magolis, D. L., Semi-Active Heave and Pitch Control for Ground Vehicles, Vehicle System Dynamics, 11 (1982), pp. 31–42), in the case of a suspension system featuring shock absorbers whose damping characteristic is adjustable in two stages (hard/soft), known as "semiactive, discrete skyhook damping" which is a switching strategy where the damping characteristic is adjusted contingent on superstructure and spring deflection movements. This strategy is presented in the following table:

|  | Shock absorber in pull state | Shock absorber in push state |
|---|---|---|
| Va > Vagr | hard | soft |
| Va < −Vagr | soft | hard |

Here, the superstructure velocity in a vertical direction, at the points of attachment of the suspension system, is abbreviated as Va. Once this velocity exceeds a certain positive bound Vagr (tuning parameter), i.e., as an impetuous upward movement of the car body is taking place, the respective shock absorber is switched in the pull state to the hard characteristic and in the push state to the soft characteristic. Conversely, an impetuous down movement of the superstructure causes in the pull stage a changeover to the soft and in the push stage to the hard characteristic. In the absence of excessive superstructure movements (|Va|≦Vagr) the shock absorber operates in its soft tuning, both in the pull and the push stage.

Shock absorbers that are adjustable in their damping characteristic are described, e.g., in DE-OS 33 04 815 and DE-OS 36 44 447.

German patent application P 40 39 629.0 describes a system where, based on the spring deflection movements, so-called "weighted corner velocities" are determined and the superstructure movements are counteracted according to the skyhook strategy described above. The weighted corner velocities are determined in such a way that a specific influencing of the collective superstructure movements, such as heave, pitch and roll movements, becomes possible. Such specific influencing of the collective superstructure movements, e.g., is favorable in steering, braking and acceleration maneuvers of the vehicle, since these movements are particularly stimulated here. The problem underlying the present invention is to design an efficient overall concept for an undercarriage control where particular allowance is made for the aspects of road safety, travel comfort and simple design.

SUMMARY OF THE INVENTION

The present system provides for a three-step operation of undercarriage regulation or control, where in a safety mode and a comfort mode the travel comfort is particularly allowed for. Furthermore, a predetermined undercarriage adjustment is chosen in a standard mode. The selection is based upon movements determined between the wheels and the vehicle superstructure, on the spring deflection movements.

While a two-step operation of undercarriage regulation or control offers the advantage that, depending on the state of travel, either the road safety or the travel comfort is favored, a three-step operation additionally makes allowance for the state of travel in which neither high requirements of road safety nor travel comfort are imposed. A predetermined undercarriage setting, particularly a soft one, avoids unnecessary and wear-promoting switchings of the undercarriage, for instance when traveling on a level road at a uniform speed, without degrading the road safety or the travel comfort.

Moreover, the present inventional system is characterized by simple and cost-effective sensor engineering because, for boosting the travel comfort for instance, there are no superstructure movement sensors necessary, such as superstructure acceleration sensors.

Furthermore, based on the spring deflection movements that have been captured, the actual value of the wheel load fluctuations and the movements of the vehicle superstructure are determined. By querying specific criteria, a determination is made as to whether the undercarriage, controllable or regulable in its sequences of movement, is being adjusted in view of minimizing the wheel load fluctuations (safety mode) or in view of minimizing the superstructure movements (comfort mode) or whether a predetermined, specifically a soft undercarriage adjustment (standard mode) is selected.

For deciding which of the three operational modes of undercarriage regulation or control should be chosen, the amounts of the actual values of the wheel load fluctuations on a wheel unit are compared with at least one first threshold Pgr. The amount of the wheel load fluctuations being a measure for the road safety, the safety mode is chosen if the first threshold, Pgr, is exceeded.

If the state of travel is not critical in terms of safety, the superstructure movements are compared with a second threshold Xagr'. These comparisons take place separately for each suspension system. In so doing, the superstructure movements are the movements of the superstructure that have been determined from the spring deflection movements and weighted in a special way, at the points where the wheel suspension systems are attached to the superstructure. The suspension systems are generally attached to the corners of the vehicle, thus the superstructure movements described above represent weighted corner movements of the vehicle superstructure.

If one of these corner movements now exceeds the second threshold Xagr', forceful superstructure movements are taking place, which inventionally are counteracted by selection of the comfort mode at the corner under review. When a corner movement falls short of the second threshold Xagr', no forceful superstructure movements are concerned, for which reason the standard setting is chosen at the respective corner.

The procedure described above is thus performed separately for each corner, or suspension system.

In the safety mode, the undercarriage adjustments are carried out in a way such that, based on the determined spring deflection movements, possible changes of the wheel load fluctuation are precalculated in addition to the actual value of the wheel load fluctuation, as a function of possible changes of the undercarriage characteristic. This, again, occurs separately for each suspension system.

By comparisons of the actual value of the wheel load fluctuation and its possible change, amongst themselves or with tuning parameters, it is possible to determine in which direction (harder or softer) the undercarriage adjustment should be carried out for minimization of the wheel load fluctuation. Furthermore, it is possible to determine whether such adjustment "pays," i.e., whether the above, precalculated minimization of the wheel load fluctuation will be sufficiently large.

The advantage of this is that only such adjustments will be carried out which will result, in a sufficient measure, in a minimization of the wheel load fluctuations.

In the comfort mode, based again on the determined spring deflection movements, the superstructure movements are minimized in such a way that the collective superstructure movements, such as heave, pitch and rolls, will be adjustable separately from one another.

Such specific influencing of the collective superstructure movements is favorable for example in steering, braking and acceleration maneuvers of the vehicle, because these movements are particularly stimulated here.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

An embodiment of the invention is illustrated in the drawings and will be explained in greater detail in the following description.

Corresponding reference characters indicate corresponding parts throughout the several views. The exemplifications set out herein illustrate a preferred embodiment of the invention, in one form thereof, and such exemplifications are not to be construed as limiting the scope of the invention in any manner.

DESCRIPTION OF THE PREFERRED EMBODIMENT

In one embodiment thereof, the present system for control or regulation of the undercarriage shall be illustrated in exemplary fashion. The vehicle comprises in this embodiment four wheel units and two axles. The suspension system is arranged between the wheels and the superstructure allowing a two-step (hard/soft) adjustment of their damping characteristic.

Figure 3A:
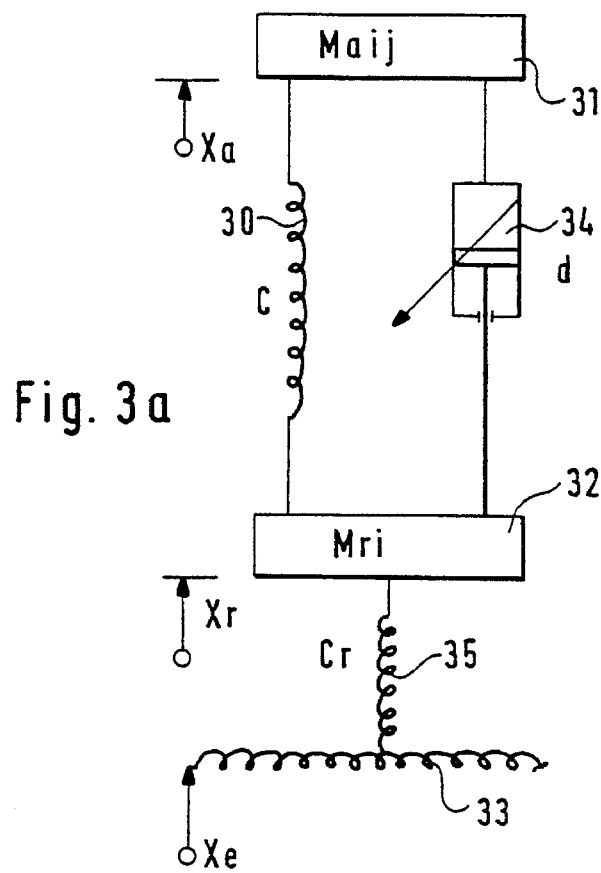
FIG. 3a shows a model of a suspension system.
Figure 3B:
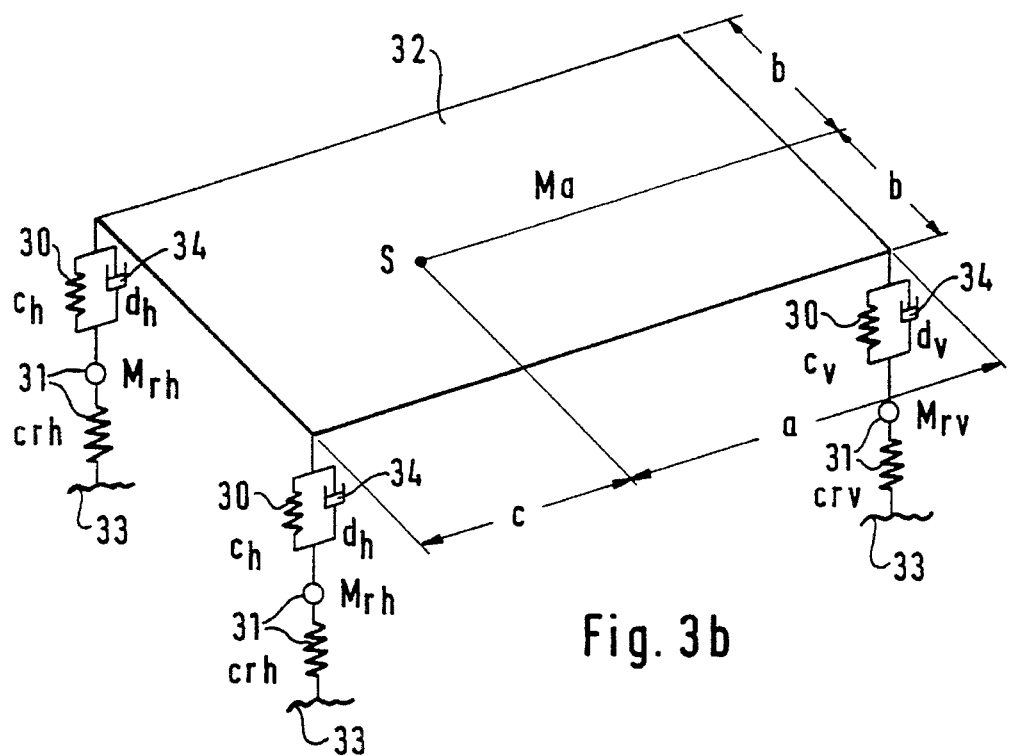
FIG. 3b depicts a spatial vehicle model.

For illustration of the variable used, reference shall be made first to the models illustrated in FIGS. 3a and 3b.

FIG. 3a shows a suspension system. Referenced 31 is the vehicle superstructure with the proportional mass $M_{aij}$. Reference 32 represents the wheel with its mass $M_{ri}$, while reference 35 represents a spring with the spring constant $C_r$. The road surface is referenced 33. A shock absorber 34 with the damping constant d represents, together with a parallel spring 30 (with spring constant C), the suspension system to be controlled/regulated. The shock absorber 34 is controllable, e.g., adjustable in its damping characteristic.

For the purpose of this application, where any form of the term "control" is used, such as "control", "controller", or "controlling", it is to be understood that such term includes the meaning of the term "regulation", i.e., such "control" may or may not include a feedback loop.

References 31, 32, 33, 34 and 35, in FIG. 3a, depict a two-body model for a suspension system. The wheel is in contact with the road surface 33, with the wheel stiffness, or tire stiffness, being described in model fashion as spring 35 with the spring constant $C_r$. The shock absorber 34 is assumed to be adjustable in this embodiment, whereas the properties of the spring 30 are described by a constant value C. Additionally, the spring 30 may also be of an adjustable design. Thus, the combination of the spring 30 and shock absorber 34 adjustable in its damping properties here represents the suspension system to be controlled/regulated. $X_a$, or $X_r$, signifies the shift of the vehicle superstructure or the shift of the wheel, and at that, the shift out of the position of equilibrium at vehicle standstill (in no-load condition). $X_e$ describes the unevennesses of the ground.

In this embodiment, index i signifies the pertaining axle, i.e., the index i=h describes the properties pertaining to the rear axle and the index i=v those pertaining to the front axle. The index j signifies the vehicle side, i.e., j=r means the right-hand vehicle side and j=l the left. The double index ij=hr, for example, indicates a variable pertaining to the rear right suspension system of the vehicle.

FIG. 3b shows a simple spatial model of a longitudinally symmetric four-wheel, two-axle vehicle. References 30 and 34 represent the spring and shock absorber systems, each consisting of a spring with the spring constant $C_i$ and a shock absorber arranged parallel to it, with the damping constant $d_i$. The wheels are referenced 31 and are described in model fashion by the successively arranged bodies with the masses $M_{ri}$ and the spring with the spring constant $C_{ri}$ representing the wheel stiffness. The road surface is marked 33 and the car body with the mass $M_a$ is referenced 32. The center of gravity S of the vehicle superstructure is spaced a distance a from the front axle and a distance c from the rear axle, while b signifies one-half spacing of the attachment points of the suspension systems to the axle, i.e., generally one-half the track width.

The following, to begin with, will illustrate the embodiment with the aid of the flow chart in FIG. 1. The mode of operation of the embodiment is demonstrated on a single suspension system.

Figure 1A:
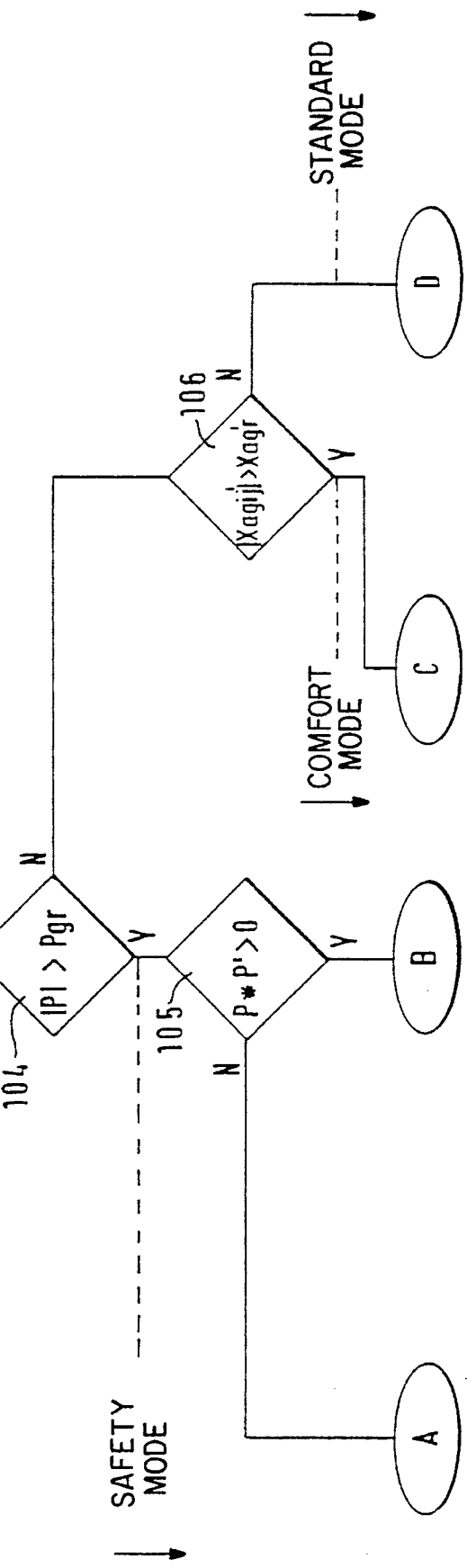
FIGS. 1a and 1b show flow charts of the operation of a suspension system according to the present invention.

As can be seen from FIG. 1a, a control cycle begins with the start 101. After acquisition of the spring deflection movements, in this example the spring deflection travel $X_{arij}$, and after acquisition of a variable of the state of travel, such as the transverse or longitudinal acceleration $a_q$ or $a_l$ of the vehicle in step 102, the next step 103 determines various variables, such as the actual wheel load fluctuation P, the possible changes P' of the actual wheel load fluctuation P, superstructure movements such as the weighted corner velocities $X_{agij}'$ at the attachment points of the suspension systems to the superstructure, and tuning parameters $P_{gr}$, $X_{agr}'$ and k.

In step 104, the actual value $|P|$ of the wheel load fluctuation is compared (by amount) with the first threshold $P_{gr}$. If $|P|$ exceeds the threshold $P_{gr}$, greater wheel load fluctuations are encountered, that is, an unsafe travel situation is on hand, since the force between wheel and road surface fluctuates heavily. In this case, the safety mode is initiated with step 105. If $|P|$ falls short of the threshold $P_{gr}$, no greater wheel load fluctuations and thus no unsafe travel situation is encountered. In this case, a query in step 106 decides whether the comfort or standard mode will be selected.

Figure 1B:
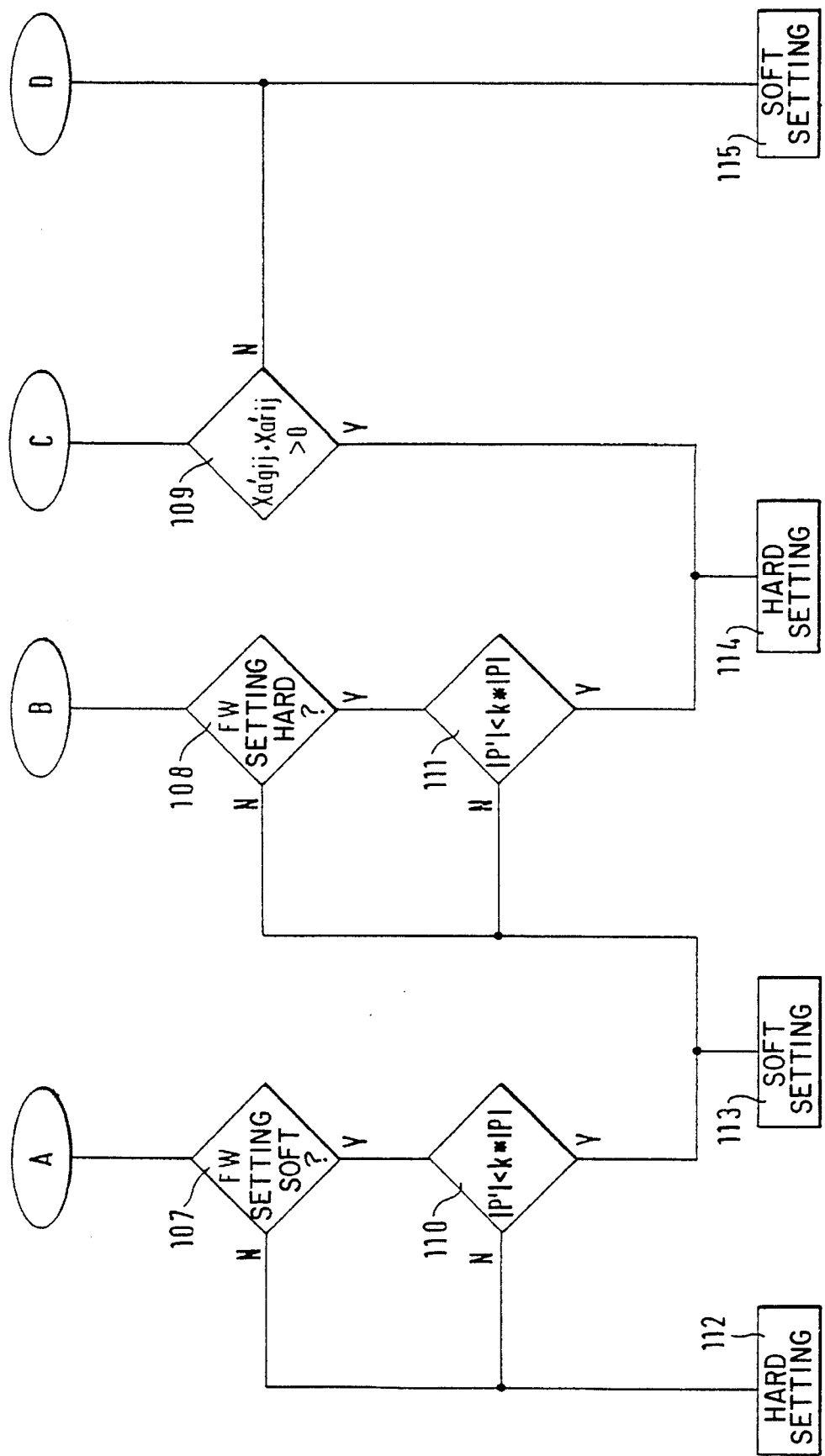

The safety mode begins with the query in step 105 where the product of the actual value of the wheel load fluctuation P with its possible change P' (the "sensitivity" or the reduction of the variable P after a "characteristic" parameter) when changing the undercarriage characteristic. For a vivid representation of the query in step 105, the following will also allow for the query in step 107 (FIG. 1b). At the same time, the queries of the actually selected undercarriage settings on the suspension system reviewed shall also be allowed for in step 108.

If P>0 (for example, road surface having a hump), then—based on an actual setting "soft"—a change to "hard" is suitable only if the sensitivity is negative, i.e., if by increasing the characteristic parameter, for instance the constant (harder setting), the wheel load fluctuation P is reduced. If P<0 (for instance road surface having a depression), then—based again on an actual setting "soft"—an adjustment toward "hard" is suitable only if the sensitivity P' is positive, i.e., when increasing the characteristic parameter, for instance the damping constant (hard setting), will increase the wheel load fluctuation P. Achieved in both cases is an increase of the road safety (minimization of the amount of the wheel load fluctuation).

The further cases in the case of the actual setting "hard" are to be considered analogously.

In steps 105, 107 and 108, the actually existing wheel load fluctuation is thus compared with its possible change in the case of an adjustment of the undercarriage. To determine the possibilities of an adjustment, the actual setting in step 107 or 108 must be queried. The further actual adjustment is now made contingent on whether a possible adjustment will result in a reduction of the wheel load fluctuation P on the respective wheel.

In steps 110 and 111, the possible adjustments—as far as having a minimizing effect on the wheel load—are examined as to whether the extent of the expected wheel load minimization, the amount of P', will exceed a threshold $k*|P|$. This means graphically whether an adjustment will "pay." It is suitable to make this threshold $k*|P|$, the product of |P| with the tuning parameter k, contingent on the actual amount of the wheel load fluctuation |P|.

An adjustment minimizing the wheel load is carried out in steps 113 or 114 only if it "pays," whereas in steps 112 or 114 the actual setting is retained unchanged. If on grounds of the query in step 104 there is no unsafe travel situation encountered, the amount of the weighted corner velocity Xagij' at the attachment points of the suspension system to the superstructure is compared in step 106 with a threshold Xagr'. If heavy superstructure movements do exist, query result Y in step 106, the comfort mode is selected in step 109. If no heavy superstructure movements are taking place, query result N in step 106, a soft undercarriage characteristic is selected with step 115 as standard mode.

In the comfort mode, the skyhook control strategy mentioned in the introduction of the specification is pursued separately on each suspension system in step 109. That is, a minimization of the movements of the vehicle superstructure is achieved in such a way that

- an adjustment to the "hard" characteristic will be carried out if the directions of the weighted corner velocities Xagij' and the directions of the pertaining relative spring deflection velocities Xarij' are identical and
- an adjustment to the "soft" characteristic will be carried out if the directions of the weighted corner velocities Xagij' and the directions of the pertaining spring deflection velocities Xarij' are opposite.

From the flow chart described above it is evident that the principle "safety before comfort" is applied. Furthermore, it is to be summarized that the above queries for adjustment of the undercarriage characteristic occur locally, i.e., on each suspension system independently of the adjustments of the other suspension systems. The superstructure movements at the attachment points of the other suspension systems are taken into consideration, as will be explained in the course of the further description, by determining the weighted corner velocities Xagij'.

This basic hierarchy "safety before comfort" can be given a finer graduation yet by making the tuning parameters, such as the variables Pgr, Xagr' and k, dependent on the momentary values of the state of travel variables, such as travel speed, longitudinal and transverse acceleration and/or ambient temperature. Hence, in straight-ahead travel (transverse acceleration equals zero) for instance, particularly at low vehicle speeds, the value of the threshold Pgr will be chosen relatively large, since in this travel situation only insignificant requirements need to be imposed on road safety.

Figure 2:
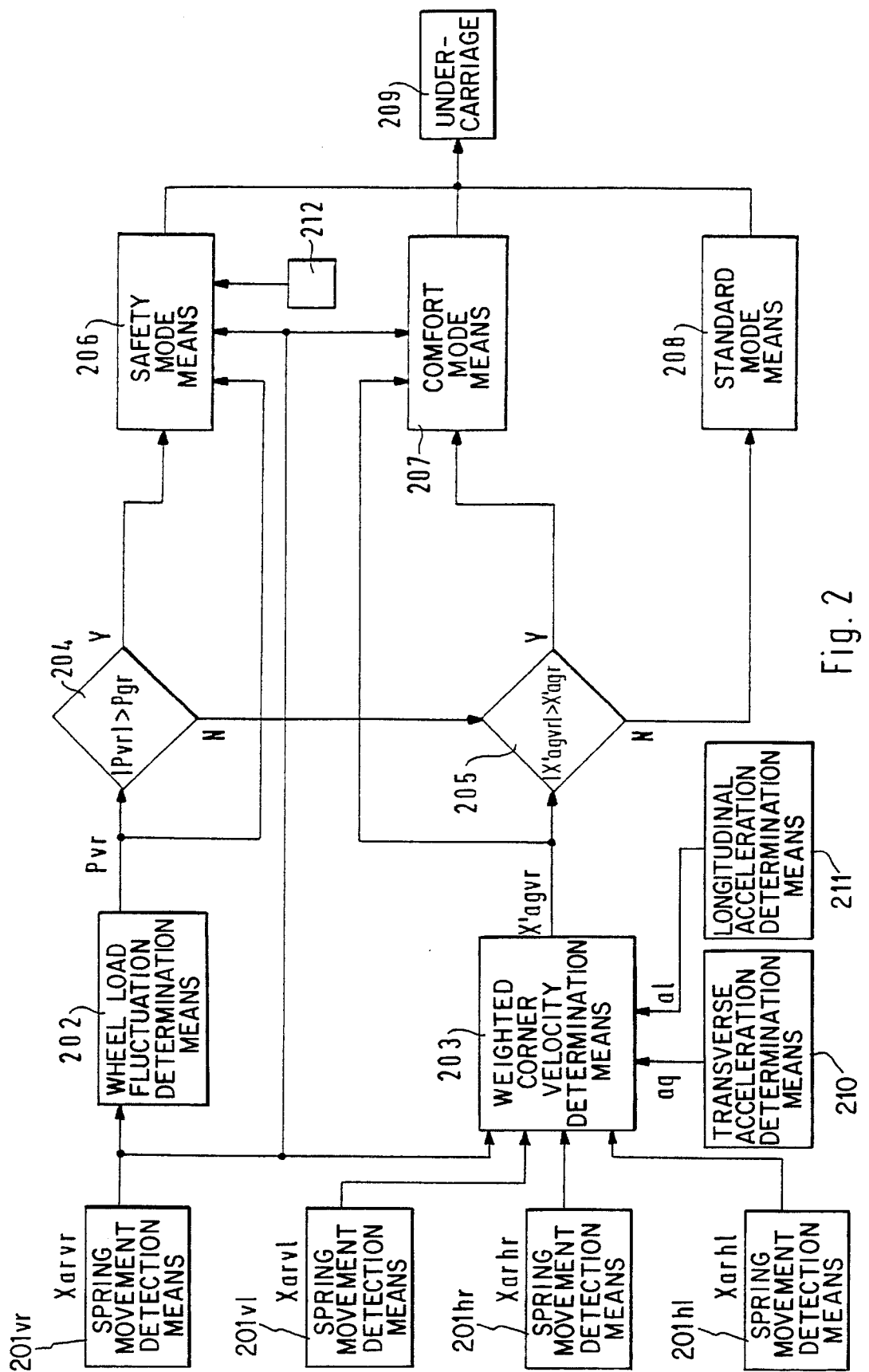
FIG. 2 shows the essential elements of the inventional system.

The essential elements for the performance of the procedure presented above are shown in FIG. 2 and will be explained hereafter in greater detail with the aid of their mode of operation. In doing so, the front right-hand suspension system is considered as an example.

For the description of the operating mode of the spring movement detection means or first means 201 and the second means 202, the following will address the physical background of the present inventional system. Wheel load fluctuation Pij is the deviation of the wheel load (normal force between tire and road surface) from its static value. While the wheel load and also perhaps the spring deflection travel which correlates directly with the wheel load fluctuation lends itself to measurement only with great difficulty, the spring deflection travel (Xa–Xr)ij (refer to FIG. 3) for instance can be detected with transducers that are relatively simple, and thus realized at low cost. On vehicles with level control, as the case may be, an already existing transducer can be utilized for determination of the spring travel. With the aid of the two-body model cited above it is possible to deduce that the sought variable Pij correlates with the spring deflection movement as follows:

$$Pij = -[(1+Mr/Ma)*C+(1+Mr/Ma)*d*s+Mr*s^2]*Xarij, \quad (1)$$

where s is the Laplace variable and the further variables can be derived from FIG. 3 or its description. Xarij signifies the so-called "deaveraged" spring travel which derives from the variable (Xa–Xr)ij, the spring travel, by subtraction of its current average $$1/Tm * \int_{t-Tm}^{t} [(Xa(r) - Xr(r))ij]dr \quad (2)$$

at $$Xarij(t) = [(Xa(t) - Xr(t))ij] - \quad (3)$$

$$\left[ 1/Tm * \int_{t-Tm}^{t} [(Xa(r) - Xr(r))ij]dr \right]$$

Here, Tm is a tuning parameter and t the actual point in time. Eliminated by this "deaveraging" of the spring travel (Xa–Xr)ij is both the effect of a load on the vehicle, that is, a change of the static spring travel, and also the effect of asymmetric (with regard to pressure and traction range) spring and/or shock absorber parameters (change of the average dynamic spring travel) upon the calculation of the wheel load fluctuation.

Captured by the spring movement detection means or first means 201 are thus the spring deflection movements for each wheel unit or spring and/or shock absorber system. This can be accomplished with appropriate sensors which detect, e.g., the relative spring deflection travel and/or the spring deflection velocity and/or variables correlating with it, for example pressure differences in the shock absorber systems. Detected in this embodiment, for each suspension system, by the first means 201 are the spring travels (Xa–Xr)ij. Furthermore, the "deaveraged" spring travels are determined in the first means 201 from the captured spring travels (Xa–Xr)ij according to the above equation (3). The first signals Xarij prevailing on the output of the first means 201 represent the "deaveraged" spring deflection travels.

A suitable development of the inventional device consists in a supplemental processing of the spring travel signal. Since the transfer function according to equation (1) between the variables Pij and Xarij shows a differentiating behavior, it is necessary to safeguard that high-frequency disturbances, for example greater than 20 Hz, will not be amplified in the measured value of the spring travel signal. This can be accomplished, for example, with filters such as a low-pass filter or, in the case of digital processing in computer units, by an additional algorithm.

One of the first signals each, per suspension system, is now transmitted to the second means 202. Since in this embodiment the system for the front, right-hand suspension system is described, the first signal Xarvr is transmitted to the second means.

The second means 202 are of a design such that, based on the first signal Xarvr prevailing on the input, they will form the actual value Pvr of the wheel load fluctuation, according to equation (1). Thus, the second means 202 are characterized by the transfer property $$-[(1+Mr/Ma)*C+(1+Mr/Ma)*d*s+Mr*s^2].$$

The values of the model parameters (Ma, Mr, C, Cr and d) are either known or can be determined for a specific vehicle whose undercarriage is to be controlled/regulated, for instance by parameter identification procedures.

Second means 202, as well as also the further means of the inventional system which are characterized by their transfer properties, can be realized in electronic digital fashion, for example by processing in computer units with electronic components, in a differential equation representing the transfer properties, or in electronic analog fashion, for example by simulation of a differential equation representing the transfer properties. Additionally, a computer-controlled configuration is also possible.

The signal Pvr prevailing on the output of the second means 202 thus represents the actual value of the wheel load fluctuation on the front right-hand wheel or suspension system reviewed.

The signal Pvr is compared, by amount, in the fourth means 204 with a first threshold Pgr If |Pvr| is greater than the first threshold Pgr, the sixth means 206 are activated; if it is smaller, the fifth means 205 are activated. The sixth means 206 represent the safety mode, which according to the query in the fourth means 204 is activated whenever greater wheel load fluctuations (|Pvr|>Pgr) are encountered. Depending on the results obtained in the sixth means 206, adjustments of the undercarriage 209 take place. The sixth means 206 as well as the twelfth means 212 will be described hereinbelow with the aid of FIG. 6.

In the third means 203, the first signals Xarij are processed in such a way that on the outputs of these means there will prevail signals Xagij' that represent weighted corner velocities. This mode of operation and the description of the weighted corner velocity will be addressed in greater detail hereinbelow with the aid of FIGS. 4 and 5.

Compared in the fifth means 205, by amount with a second threshold Xagr', is the second signal Xagvr' for the suspension system under review If |Xagvr'| is greater than the second threshold Xagr', the seventh means 207 are activated; if it is smaller, the eighth means 208 are activated. The seventh means 207 represent the comfort mode, which according to the query in the fifth means 205 is activated whenever there are more significant superstructure movements existing on one vehicle corner. Depending on the results obtained in the seventh means 207, adjustments of the undercarriage 209 take place. The seventh means 207 as well as the tenth and eleventh means 210 and 211 will be described hereinbelow with the aid FIGS. 4 and 5.

If no significant weighted corner velocities (|Xagvr'|<Xagr') exist, an activation of the undercarriage 209 is carried out in the standard mode by the eighth means 208, to the effect that a predetermined, specifically soft undercarriage characteristic will be selected.

Figure 6A:
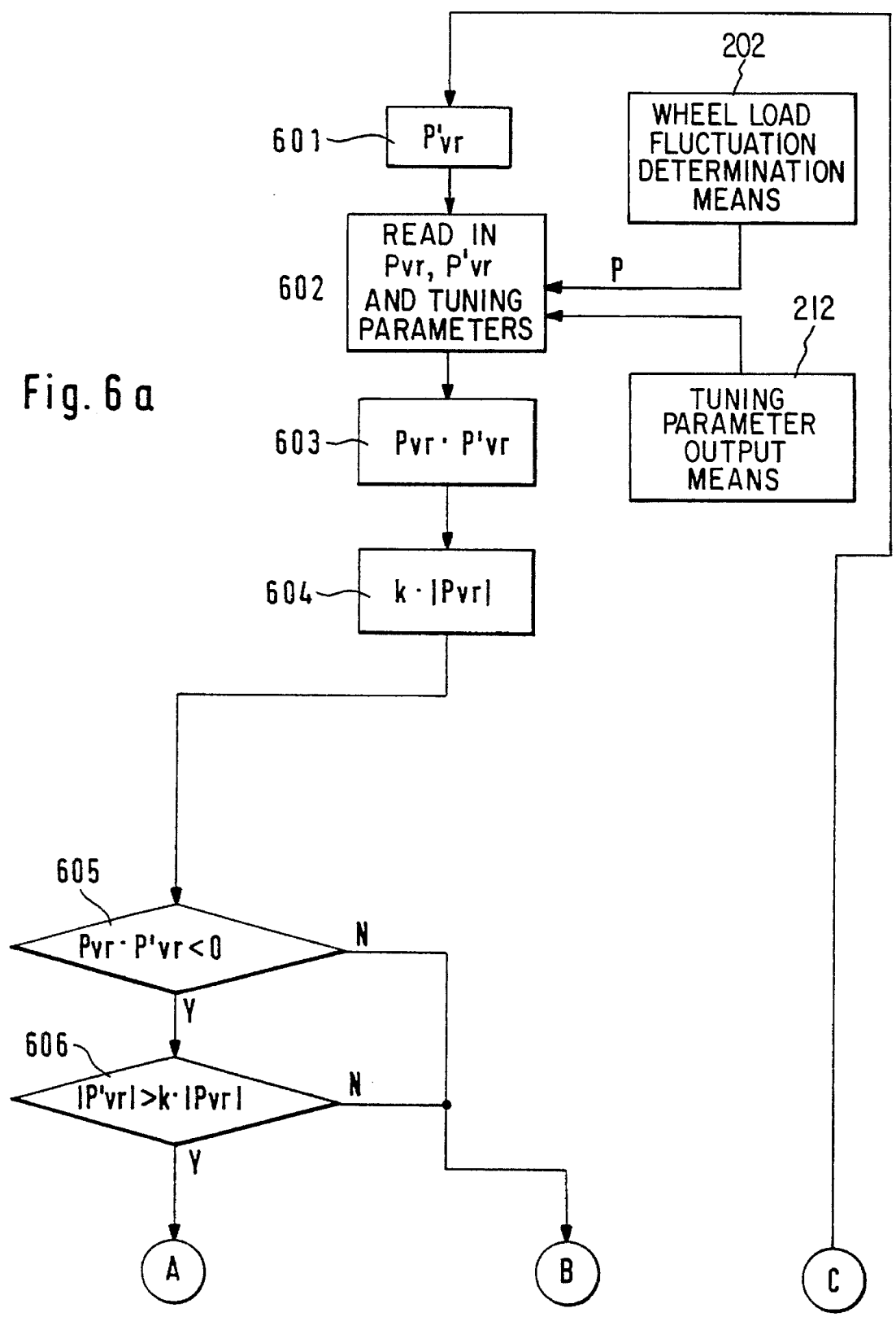
Figure 6B:
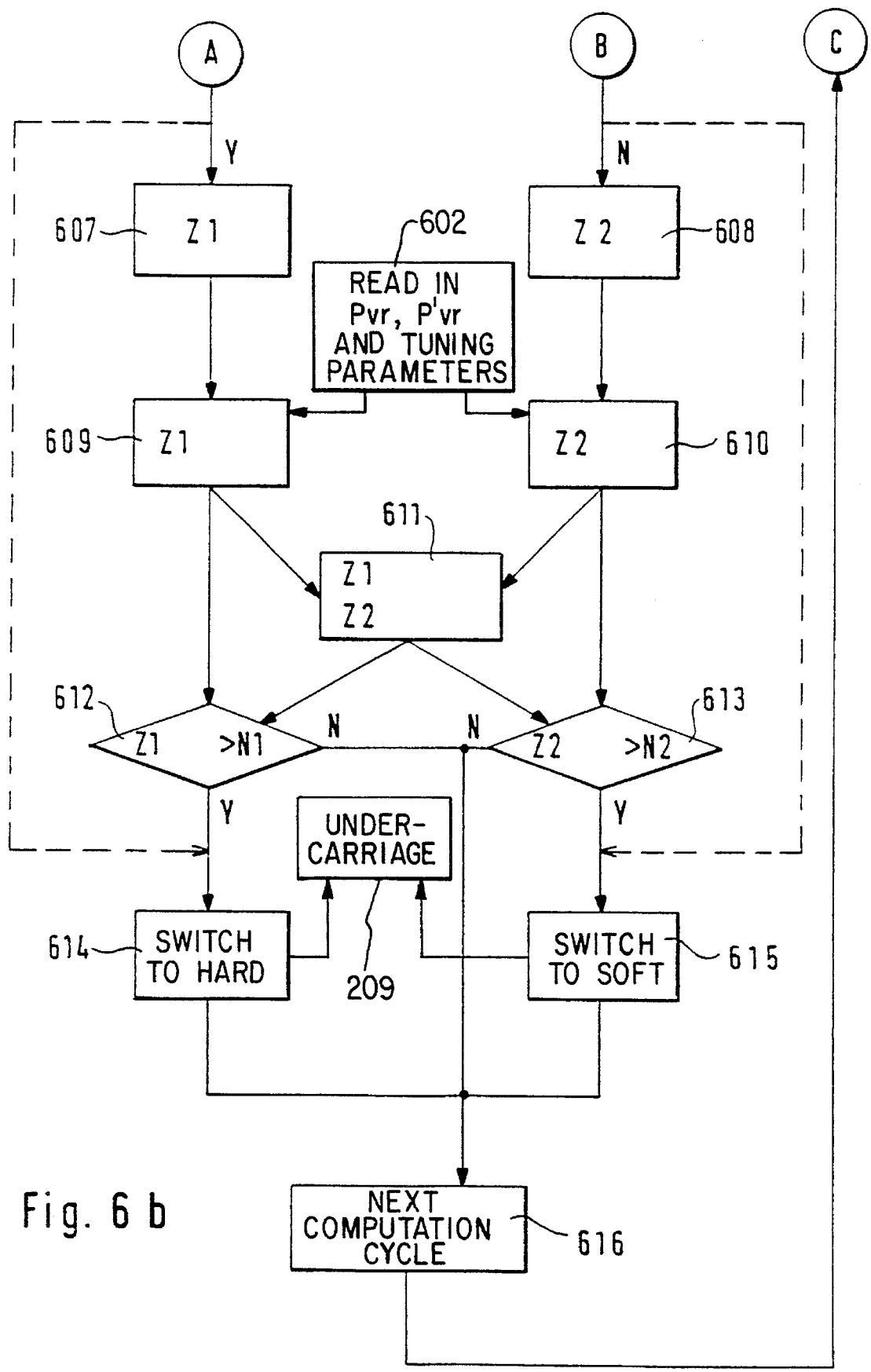

Before illustrating the mode operation of the means 209 with the aid of FIGS. 6a and 6b, the physical background of the action of the safety mode shall be addressed.

Through the two-body model described in conjunction with FIG. 3a one arrives at a correlation $$Pij'=\delta Pij/\delta d=-[(Ma*Cr*s^3)/D(s)]*Xarij \quad (4)$$

between the sensitivity Pij' (regarding the damping constant d) and the "deaveraged" spring deflection travel Xarij with the abbreviation $$D(s)=C*Cr+Cr*d*s+(C*Mr+(C+Cr)*Ma)*s^2+(Ma+Mr)*d*s^3+Ma*Mr*s^4 \quad (5).$$

This value Pij' is a measure for the sensitivity of the wheel load fluctuation Pij, if the damping constant d of the shock absorber system to be controlled/regulated is modified. Particularly the mathematical sign of Pij' provides an information as to whether the wheel load fluctuation Pij will be increased or reduced through a change of the damping constant d of the shock absorber system to be controlled/regulated. Since optimizing the road safety conjoins with minimizing the variable Pij, the information (4) on the sensitivity Pij' of the variable Pij is an important decision criterion as regards a control/regulation of a shock absorber system. In the general case, the sensitivity Pij' is defined as the derivation of the wheel load fluctuation Pij according to a "characteristic" undercarriage parameter. The latter is characterized in that different parameter values describe different undercarriage tunings. For a spring system to be controlled/regulated, these parameters may for instance possess the physical meaning of a spring stiffness. In this case, the sensitivity Pij' (regarding the spring stiffness C) is $$Pij'=\delta Pij/\delta C=-[(Ma*Cr*s^2)/D(s)]*Xarij \quad (5),$$

where D(s) is also given here by the equation (5). The values of the model parameters Ma, Mr, C, Cr and d (refer to FIG. 3) are either known or can be determined for a specific vehicle whose undercarriage is to be controlled/regulated, for instance by parameter identification procedures.

When capturing the relative velocity (Xa'-Xr')ij, or the relative acceleration (Xa"-Xr")ij, instead of the spring travel (Xa-Xr)ij, the expressions in the square brackets, to the right of the equal sign in equations (1), (4) and (5), are to be divided by the Laplace variable s (in the case of determining the relative velocity (Xa'-Xr')ij) and $s^2$ (in the case of determining the relative acceleration (Xa"-Xr")ij). The "deaveraging" of the measured variables (Xa'-Xr')ij, or (Xa"-Xr")ij, can then be performed analogous to equation (3), where Xarij becomes Xarij', or Xarij", and the measured variable (Xa-Xr)ij becomes (Xa'-Xr')ij, or (Xa"-Xr")ij.

Figure 7A:
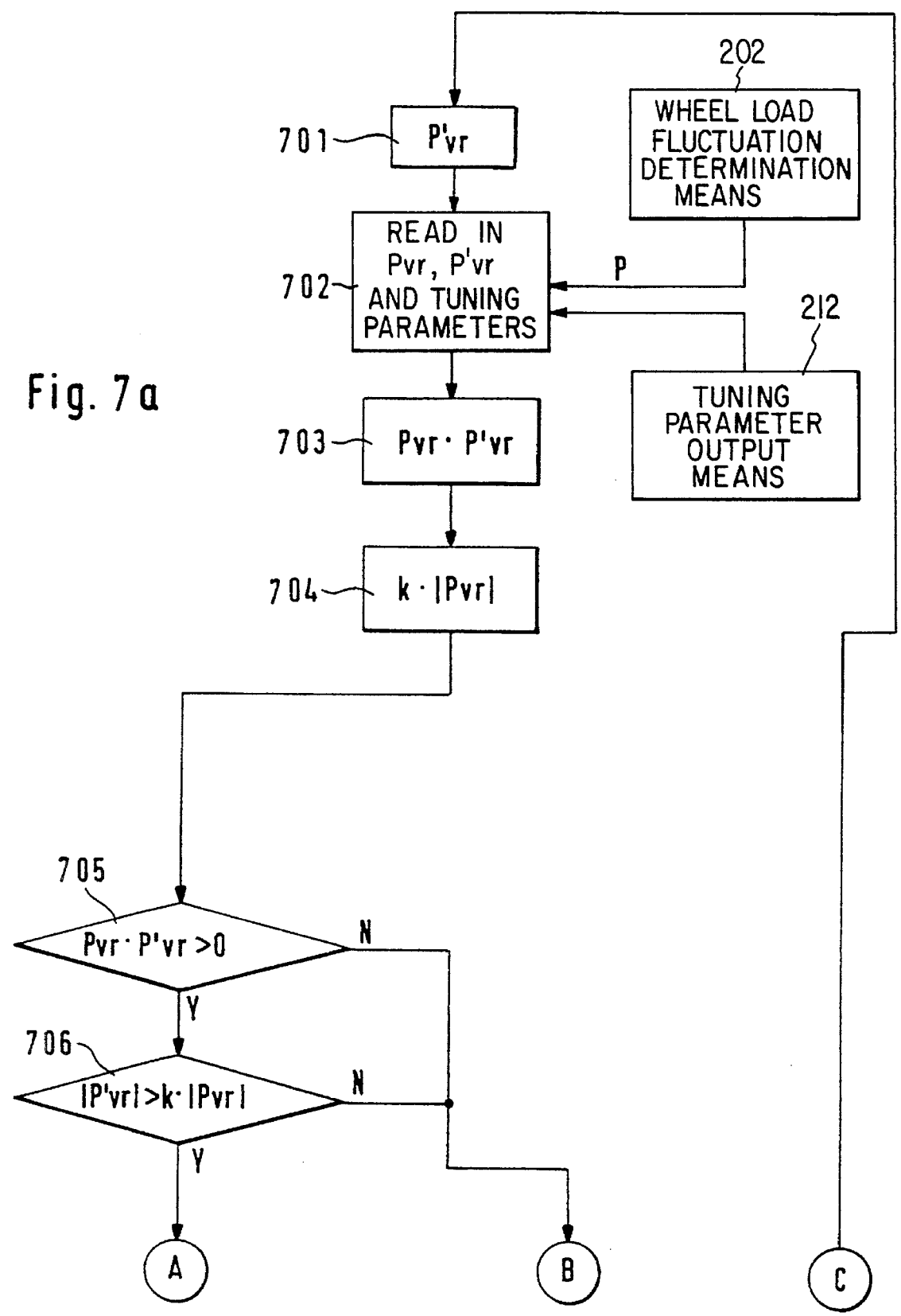

From knowing the sensitivity Pvr' it follows that it is particularly favorable to perform a changeover of the spring and/or damping characteristic, as illustrated in FIGS. 6 and 7, under the following aspects:

During a travel situation which is critical in terms of safety, that is, with the condition $$|Pvr|>Pgr \quad (6)$$

(query in the fourth means 204) met, a modification of the undercarriage tuning is recommended particularly if additionally the condition $$|P'|>k*|P| \quad (7)$$

is met. Furthermore, a modification of the undercarriage characteristic toward "hard" is suitable when additionally the condition $$P*P'<0 \quad (8a)$$

is met. In contrast, with $$P*P'>0 \quad (8b)$$

a modification in the direction "soft" is suitable. Here, the variables Pgr and k are to be considered as undercarriage tuning parameters. These may either assume constant values for the undercarriage to be controlled/regulated, or they are dependent on variables affecting the state of travel, such as for instance the vehicle speed V, longitudinal and/or transverse vehicle acceleration al or aq, and/or the ambient temperature T.

The meaning of the aforementioned three equations (6), (7) and (8a, b) can be described graphically. With the cited conditions met, this has the following meaning:

Condition (6):
Adjustment of the spring and/or damping characteristic if the wheel load fluctuation exceeds a certain variable Pgr. That is, the vehicle is in a critical situation of travel.

Condition (8a, b):
Adjustment of the spring and/or damping characteristic only if this change results in a reduction of the momentary wheel load fluctuation P. For instance, with P positive (and according to condition (6) greater than Pgr) and the momentarily selected characteristic happens to be "soft," the latter will be adjusted toward "hard" if the sensitivity P' is negative, that is, an increase of the characteristic parameter, for instance of the damping constant (harder tuning) reduces the wheel load fluctuation P. If at the point in time considered (momentarily selected characteristic "soft") the sensitivity P' is positive, changing the tuning toward "hard" would result in increasing the wheel load fluctuation P.

Condition (7):
Adjustment of the spring and/or damping characteristic only if it "pays" in view of improving the road safety. That is, the change of the wheel load fluctuation accomplished by the modification must, with regard to the momentary wheel load fluctuation, reach a value which can be determined by the value k.

With the aid of FIGS. 6 and 7, the action of the safety mode (sixth means 206 in FIG. 2) will be explained in greater detail. FIG. 6 illustrates the case in which the setting "soft" is chosen as the momentarily existing undercarriage adjustment. FIG. 7 shows the case in which the setting "hard" is selected as the momentarily existing undercarriage adjustment. FIGS. 6 and 7 will be described jointly in the following.

While the condition (6) is queried in the fourth means 204, the sensitivity Pvr' is determined in step 601 (FIG. 6a), or step 701 (FIG. 7a), according to equations (4) or (5), that is, possible changes of the wheel load fluctuation on the front right-hand wheel are determined in step 601 or 701 as a function of possible changes of the undercarriage characteristic. In the following step 602, or 702, the variable Pvr determined in the second means 202 is entered. Furthermore, the positive tuning parameter k is entered in this step. This value k, the same as the first and second thresholds Pgr and Xagr', can either assume constant values for the undercarriage to be controlled/regulated or are contingent on variables influencing the state of travel, such as the vehicle speed V, the longitudinal or transverse acceleration al or aq of the vehicle and/or the ambient temperature T. In this example, the tuning parameter k is provided by the twelfth means 212. Additionally, the parameters Z1, Z2, Tr, N1 and N2 are read in, in step 602 or 702, by the twelfth means.

In steps 603 and 604, or 703 and 704, the variables (Pvr*Pvr') and k*|Pvr| are formed. The queries according to the above equations (7) and (8a,b) are carried out in steps 605 and 606, or 705 and 706.

If, based on a soft undercarriage adjustment (FIG. 6), the conditions (7) and (8a) (steps 605 and 606) are met, a changeover to "hard" is effected in step 614, in branch A of FIG. 6, the steps to be described hereinbelow. If at least one of the conditions (7) or (8a) is not met, a changeover to "soft" is effected in step 615, in the branch B of FIG. 6, the steps to be described hereinbelow, or a soft setting is retained.

If, based on a hard undercarriage adjustment (FIG. 7) the conditions (7) and (8b) (steps 705 and 706) are met, a changeover to "soft" is effected in step 714, in branch A of FIG. 7, the steps to be hereinbelow described. If at least one of the conditions (7) or (8a) is not met, a changeover to "hard" is effected in step 715, in branch B of FIG. 7, the steps to be described hereinbelow, or a hard setting is retained.

Depending on the query result of steps 605 and 606, or 705 and 706, steps 607 or 608 (FIG. 6b), or 707 or 708 (FIG. 7b), are selected.

Thus, if the output signals of steps 605 and 606, or 705 and 706, simultaneously possess the value Y, a counting signal Z1 is provided in step 607, or 707, which is counted in step 609 or 709. If in at least one of the steps 605 and 606, or 705 and 706, the value N prevails as an output signal, a counting signal Z2 is provided in step 608 or 708 which is counted in step 610 or 710.

The counter contents Z1ges and Z2ges existing in steps 609 and 610, or 709 and 710, are compared in steps 612 and 613, or 712 and 713, with set values N1 and N2. Specifically, the counter contents Z1ges and Z2ges are compared with the sum Z1ges+Z2ges, as set values, which sum is formed in step 611 or 711. Additionally it is favorable to compare the counter contents Z1ges and Z2ges with one another, as set values. Furthermore, the counter contents can be compared with set variables which are determined contingent upon variables influencing the state of travel, such as travel speed V, longitudinal and transverse acceleration al, aq of the vehicle and/or the ambient temperature T. The counters are reset by entering reset signals, which are given after each changeover of the damping and/or spring characteristic and/or at certain time intervals Tr and/or contingent on the counter contents and/or on variables influencing the state of travel, in steps 609 and 610 or 709 and 710. If the counter contents Z1ges or Z2ges exceed the determined and/or established set values N1 and N2, the signals Y will prevail on the outputs of steps 612 and 613, or 712 and 713; if the counter contents Z1ges or Z2ges fall short of the determined and/or established set values, the signals N will be present on the output of steps 612 and 613 or 712 and 713.

An option relatively simple to realize in steps 612 and 613, or 712 and 713, is comparing the counter contents Z1ges and Z2ges with numeric set values N1 and N2 per the sum of Z1ges+Z2ges. This avoids the performance of a changeover to a harder damping and/or spring characteristic in travel situations where only the wheel load fluctuation is increased, without jeopardizing the road safety (for instance when traveling over a sewer cover). Thus, avoiding unnecessary changeovers, for one, increases the travel comfort without affecting the road safety and, for another, prolongs the service life of the regulable spring and/or shock absorber system, since of necessity there are mechanical actuators used that are susceptible to wear.

If the counter content Z1ges exceeds the set value N1, the undercarriage 209 is activated in step 614 to the effect of selecting a hard undercarriage characteristic and thereafter starting a new computation cycle. If the counter content Z2ges exceeds the set value N2, the undercarriage 209 is activated in step 615 to the effect of selecting a soft undercarriage characteristic and then starting a new computation cycle. If the counter contents Z1ges and Z2ges fall short of the set values N1 and N2, the computation cycle illustrated in FIG. 6 is performed again, which is indicated by step 614.

If the counter content Z1ges exceeds the set value N1, the undercarriage 209 is activated in step 714 to the effect of setting a soft undercarriage characteristic and subsequently starting a new computation cycle. If the counter content Z2ges exceeds the set value N2, the undercarriage 209 is activated in step 715 to the effect of selecting a hard undercarriage characteristic and subsequently starting a new computation cycle. If the counter contents Z1ges and Z2ges fall short of the set values N1 and N2, the computation cycle illustrated in FIG. 7 is performed anew, which is indicated by step 716.

The next computation cycle (step 616 or 716) may either directly follow the previous cycle or take place contingent upon time and/or variables influencing the state of travel, such as travel speed V, vehicle longitudinal acceleration al and/or vehicle transverse acceleration aq and/or ambient temperature T. Formed thereby are intervals at the start of which the inventional control/regulation cycle is always performed. This may be so arranged, for instance, such that at slow travel speed (for instance in parking) the cycle is performed at greater intervals than it is at high speeds.

Figure 7B:
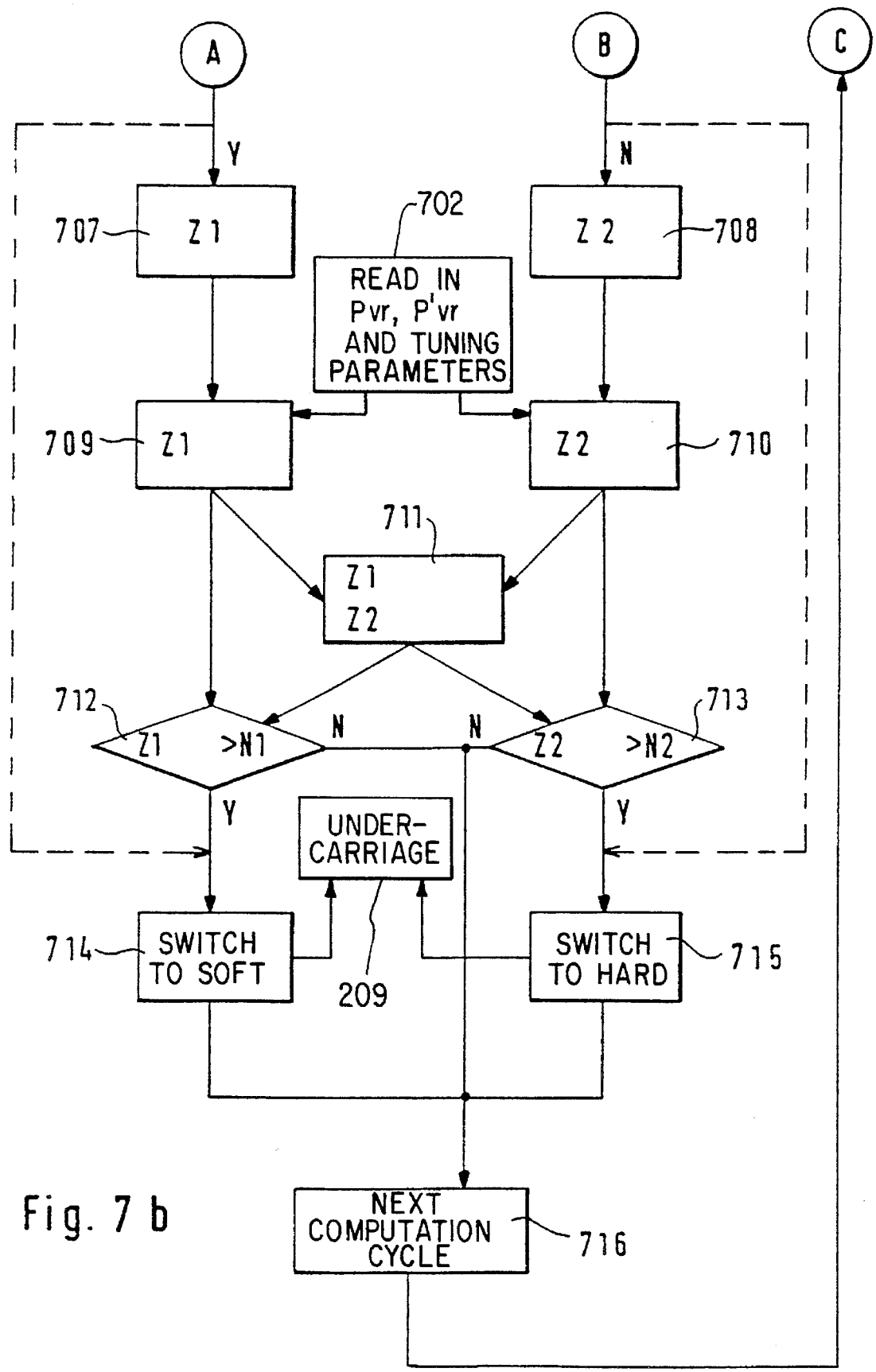

Moreover, a further embodiment of the inventional system which is particularly simple to realize consists in circumventing the steps 607 through 613 (inclusive), or 707 through 713 (inclusive), (broken lines in FIG. 6b and 7b). In this case, with at least one of the above information equations not met (signal N on the input of step 608 or 708), a signal for switching to a soft characteristic is issued in step 615, or to the hard characteristic in step 715. A changeover from the harder (FIG. 6) or softer (FIG. 7) damping and/or spring characteristic takes place if each of the above information equations is met (signal Y on the input of step 607 or 707), by supplying a switching signal in steps 614 or 714. This embodiment is characterized by minimal expense, since the steps 607 through 613 (inclusive), or 707 through 713 (inclusive), are superfluous.

Figure 4:
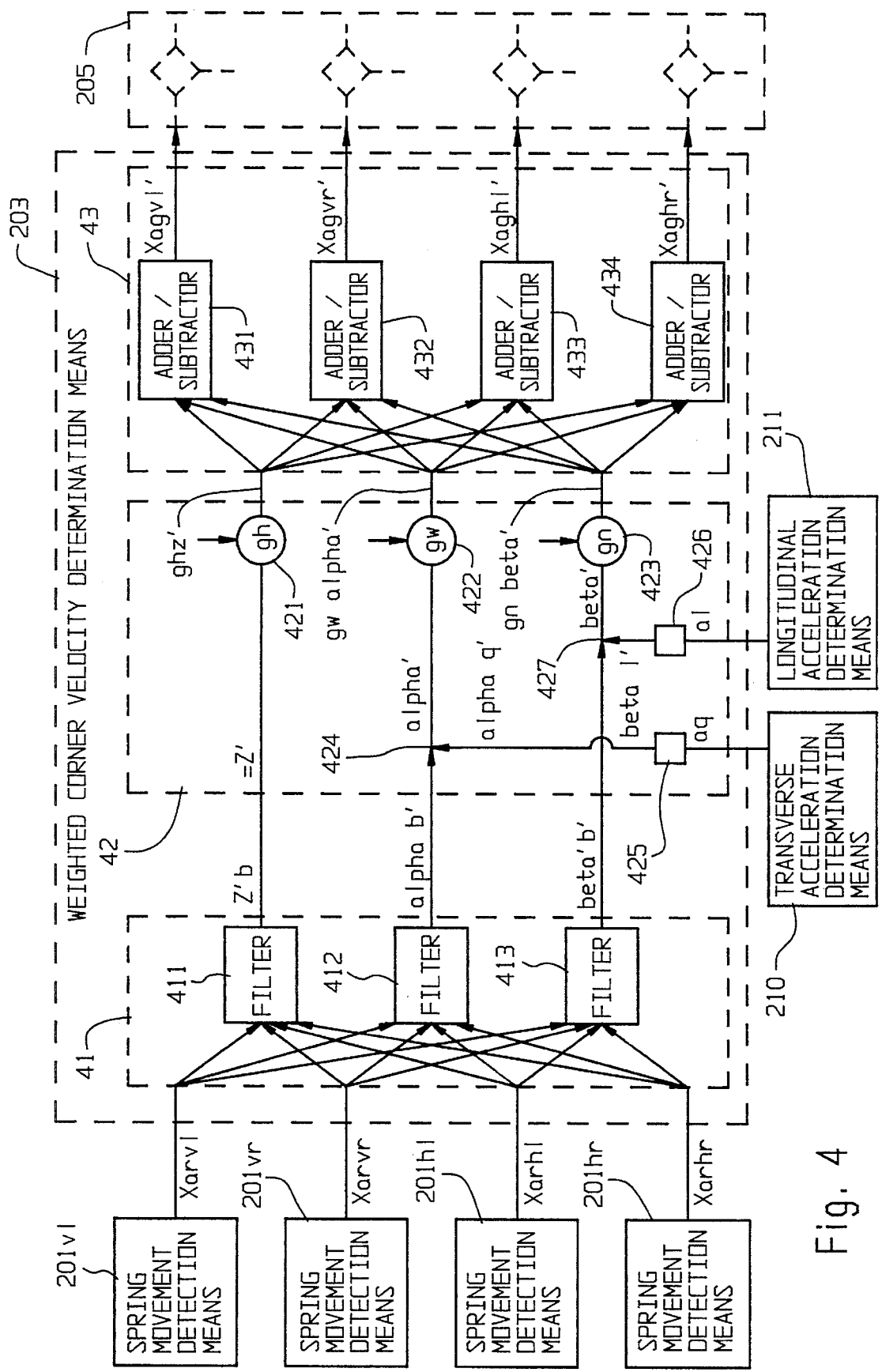
FIGS. 4, 5, 6a, 6b, 7a and 7b detail modes of operation of the present essential elements of the present system.

The mode of operation of the third means 203 will be described hereafter with the aid of FIG. 4.

The first signals Xarij are passed to forty-first means 41 where they are linked with one another. This linkage occurs in the filter units 411, 412 and 413. The entire forty-first means 41 may be characterized by their transfer behavior, which in matrix notation may be represented as follows:

$$\begin{pmatrix} S & S & Sh & Sh \\ Sv/r & -Sv/r & Sh/r & -Sh/r \\ -Sv/p & -Sv/p & Sh/q & Sh/q \end{pmatrix} \quad (7)$$

where $S(s)=-(Cv+dv*s)/(Mk*s)$ and $Sh(s)=-(Ch+dh*s)/(Mk*s)$ and $1/r=(b*Mk)/Iw$ and $1/p=(a*Mk)/In$ and $1/q=(c*Mk)/In$ and s=the Laplace variable, a=the spacing between front axle and center of gravity of the car body, c=the spacing between rear axle and center of gravity of the car body, b=one-half the spacing of the attachment points of the suspensions systems at the axle, generally one-half the track width, Mk=the mass of the car body, Iw=the mass inertia relative to the roll axis, In=the mass inertial moment relative to the pitch axis, dv=the damping constant of the shock absorbers on the front axle, dh=the damping constant of the shock absorbers on the rear axle, C=the stiffness of the springs on the front axle, and Ch=the stiffness of the springs on the rear axle.

Thus, the first signals Xarij of the spring deflection travels are combined linearly in the forty-first means 41, as described hereafter:

$$\begin{pmatrix} zb' \\ alphab' \\ betab' \end{pmatrix} = \begin{pmatrix} S & S & Sh & Sh \\ Sv/r & -Sv/r & Sh/r & -Sh/r \\ -Sv/p & -Sv/p & Sh/q & Sh/q \end{pmatrix} * \begin{pmatrix} Xarvl \\ Xarvr \\ Xarhl \\ Xarhr \end{pmatrix}$$

The linkages amongst one another are obtained in mathematically formal fashion by matrix multiplication of the four-component vector (Xarvl, Xarvr, Xarhl, Xarhr) by the matrix (7) characterizing the transfer performance. The individual filter units 411, 412 and 413 may be configured as adders, for instance according to the vector matrix multiplication rule, as follows:

Filter unit (FE) 411: Xarvl*Sv+Xarvr*Sv+Xarhl*Sh+Xarhr*Sh

FE 412: Xarvl*Sv/r–Xarvr*Sv/r+Xarhl*Sh/r–Xarhr*Sh/r

FE 413: –Xarvl*Sv/p–Xarvr*Sv/p+Xarhl*Sh/q+Xarhr*Sh/q

The linkage results deriving thereof correspond to collective superstructure movements, such as the heave, roll and pitch velocities zb', alphab' and betab' of the vehicle superstructure stimulated by ground unevennesses. Described here by alphab or betab is the turning of the vehicle superstructure about its roll or pitch axis, and by zb, the heave of the superstructure. alphab', betab' and zb' are the respective first time derivations of the variables alphab, betab and zb.

The linkage results alphab' and betab' on the output of the forty-first means 41 represent the actually existing roll and pitch velocities alpha' and beta' only for the case in which the vehicle travels straight ahead unaccelerated, whereas the heave velocity zb' is determined independent of the state of acceleration of the vehicle, that is, zb'=z', where z' is the actual given heave velocity. If braking, acceleration and/or steering maneuvers are taking place, and the roll and pitch velocities alphab' and betab' are to be supplemented by the terms $$alphaq'=(Ew(s)*aq)/(Iw*s) \text{ and } betal'=(En(s)*al)/(In*s) \quad (8)$$

through the additive linkage 424 and 427 in the forty-second means 42, in such a way that $$alpha'=alphab'+alphaq' \text{ and } beta'=betab'+betal' \; (zb'=z') \quad (9).$$

Here, aq and al are the transverse and longitudinal accelerations of the vehicle which are determined in the tenth and eleventh means 210 and 211. Ew and En are transfer functions, where s represents the Laplace variable.

The variables Ew and En may be determined on the basis of tire models. In a simple embodiment of the present inventional system, the variable Ew and En have the form $$Ew=h*Mk \text{ and } En=-h*Mk, \quad (10),$$

where Mk represents the mass of the vehicle body and h the center of gravity level of the vehicle.

While the signals of the transverse and/or longitudinal acceleration aq and/or al prevail on the input of the filter units 425 and 426, the signals alphaq' and betal' prevail on the output of filter units 425 and 426, whose transfer performance can be described by equations (8) with Ew(s)/(Iw*s) for the filter unit 425 and En(s)/(In*s) for the filter unit 426.

The signals representing the transverse acceleration aq and the longitudinal acceleration al of the vehicle are detected in the tenth and eleventh means 210 and 211. This can be accomplished, e.g., with suitable acceleration sensors.

But it is favorable to use signals of the transverse acceleration aq of the vehicle from the signals of a steering angle sensor, especially when these signals are also used, for example, for a servo steering control or regulation.

Moreover, it is favorable to derive the signals of the longitudinal acceleration al of the vehicle from the signals of wheel RPM sensors which are also used, e.g., in an antilock system.

Supplemented in this way, the heave, pitch and roll velocities alpha', beta' and z'—which also represent the actual collective superstructure movements in the case of steering, braking and acceleration maneuvers—are weighted in the forty-second means 42 by the multiplicative linkages 421, 422 and 423. This is accomplished through multiplications by the variables gh, gw and gn and can be performed separately. Furthermore, the weighing of the superstructure movements may also be handled additively. Prevailing on the output of the forty-second means 42 are thus the weighted superstructure movements ghz', gwalpha' and gnbeta'.

It is favorable to select the values gh, gw and gn contingent on variables that represent and/or influence the state of travel, such as travel speed, braking, and/or acceleration maneuvers of the vehicle and/or ambient temperature.

In summary, it can be said with regard to the influencings in the forty-second means 42 that here, for one, the actual heave, pitch and roll velocities are reconstructed from the relative path signals between superstructure and wheel units and from the signals representing the transverse acceleration aq and longitudinal acceleration al of the vehicle and, for another, that a specific influencing of the actual superstructure movements is possible, for instance to emphasize or dampen a specific movement especially in the subsequent data evaluation and changeover of the damping characteristic.

In one embodiment of the inventional system of simple configuration, the forty-second means 42 may be circumvented. Here, merely the collective superstructure movements caused by ground unevennesses are then utilized for calming the superstructure movements.

The weighted collective superstructure movements are now subjected to further processing in the forty-third means 43. The entire forty-third means 43 can be characterized in their transfer performance, in matrix notation, as follows.

$$\begin{pmatrix} 1 & b & -a \\ 1 & -b & -a \\ 1 & b & c \\ 1 & -b & c \end{pmatrix} \quad (11)$$

where (refer to FIG. 3b)

a=the spacing between front axle and center of gravity S of the car body, c=the spacing between rear axle and center of gravity S of the car body, b=one-half the spacing between the attachment points of the suspension systems at the axle, i.e., generally one-half the track width.

Thus in the forty-third means 43, the signals of the weighted superstructure movements are linearly combined as described hereafter:

$$\begin{pmatrix} X'_{agvl} \\ X'_{agvr} \\ X'_{aghl} \\ X'_{aghr} \end{pmatrix} = \begin{pmatrix} 1 & b & -a \\ 1 & -b & -a \\ 1 & b & c \\ 1 & -b & c \end{pmatrix} * \begin{pmatrix} ghz' \\ gwalpha' \\ gnbeta' \end{pmatrix}$$

The linkages amongst one another are derived in a mathematically formal way through multiplication of the three-component vector (ghz', gwalpha', gnbeta') by the matrix (11) characterizing the transfer performance. The individual units 431, 432, 433 and 434 may be configured as adding or subtracting units, for example according to the vector matrix multiplication rule, as follows.

Unit 431: gh*z'+gw*alpha'*b−gn*beta'*a
Unit 432: gh*z'−gw*alpha'*b−gn*beta'*a
Unit 433: gh*z'+gw*alpha'*b+gn*beta'*c
Unit 434: gh*z'−gw*alpha'*b+gn*beta'*c.

As results of this linear combination, the weighted corner velocities Xagvl', Xagvr', Xaghl' and Xaghr' prevail on the output of the forty-third means 43, or the third means 203. Here, the weighted corner velocities are the weighted superstructure velocities at the points of the vehicle superstructures where the adjustable shock absorbers attach to it.

The weighted corner velocities obtained in this way are for each suspension system fed to the fifth means 205, where the weighted corner velocities Xagvl', Xagvr', Xaghl' and Xaghr' are compared with the second thresholds Xagr', as previously described.

Figure 5:
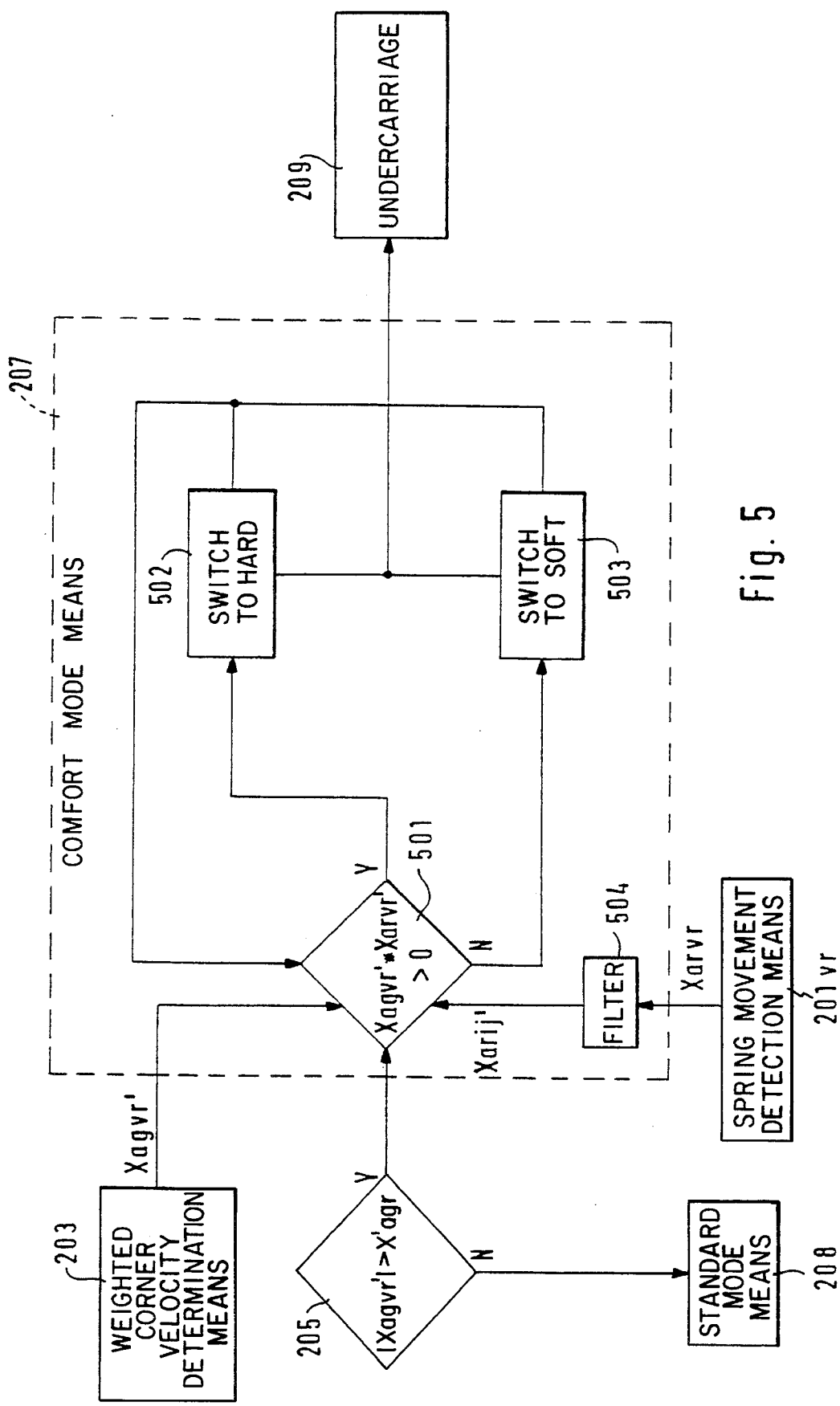

The mode of operation of the seventh means 207 (comfort mode) will be illustrated hereafter with the aid of FIG. 5.

If a weighted corner velocity Xagvr' exceeds the second threshold Xagr (more pronounced superstructure movements), an appropriate signal Y is fed by the fifth means 205 to a comparator 501. At 501, the product Xagvr'*Xarvr' of the weighted corner velocities Xagij' (from the third means 203) is analyzed with the pertaining spring deflection velocity Xarvr'.

The spring deflection velocity Xarvr' is obtained on the output of the filter unit 504, by the differentiating characteristic of which the spring deflection paths Xarvr of the first means 201 are differentiated.

If the product Xagvr'*Xarvr' is greater than zero, the signal Y prevails on the output of the comparator unit 501; if it is smaller than zero, the signal N prevails on the output of the comparator unit 501.

The signal Y on the output of the comparator unit 501 is passed to the means 502 for changeover of the damping characteristic, where a changeover to a harder characteristic of the front, right-hand suspension system is carried out.

The signal N on the output of the comparator unit 501 is passed to means 503 for changeover of the damping characteristic, where a changeover to a softer characteristic of the front, right-hand suspension system is carried out.

An advancement of the setup of the fifth means 205 described above may consist in comparing the amounts of the weighted corner velocities |Xagij'| with several pertaining second thresholds Xagr1vr', Xagr2vr', Xagr3vr' . . . Contingent on the more detailed amount value of |Xagvr'| obtained thereby, specific damping characteristics of the respective shock absorber system may be adjusted, whereas with the arrangement described above only the next harder or softer step is activated.

A particularly simple embodiment of the inventional system is the two-step configuration of the undercarriage, for example with shock absorbers adjustable in two steps, where a hard and a soft undercarriage characteristic is given. In this case, the steps "hard" or "soft" are selected.

The mode of operation of the fifth means 205 and seventh means 207 can be summarized as described hereafter.

1. The amounts of the weighted corner velocities are analyzed by their size, and changeovers of the respective adjustable shock absorber system are carried out depending on the size of the amount of the weighted corner velocities.
2. A changeover to a harder damping characteristic is performed if the directions of the pertaining weighted corner velocities and pertaining relative spring deflection velocities are equal.
3. A changeover to a softer damping characteristic is performed if the directions of the pertaining weighted corner velocities and pertaining relative spring deflection velocities are opposite.

In this way it is achieved that the changeovers of the damping characteristics of the shock absorber systems will influence the respective corner velocities of the vehicle superstructure in reducing fashion. This achieves a minimization of the superstructure movements. The weighing of the heave, pitch and/or roll movements enables a specific influencing of these movements.

The "safety before comfort" principle underlying the inventional system can, as already mentioned, be given a finer graduation in that the tuning parameters, such as the variables Pgr, Xagr', k, N1, N2, Tr, are made contingent on the momentary value of state of travel variables, such as travel speed, longitudinal and transverse acceleration and/or ambient temperature. The value of the threshold Pgr, for example in straight-ahead travel (transverse acceleration equals zero), particularly at low vehicle speeds, will then be chosen relatively large, since in this situation of travel only low requirements need to be imposed on road safety.

Furthermore, it is advantageous to choose the values of gh and gn large (as compared to gw), in order for the heave and pitch movement of the car body to ebb off relatively swiftly in the comfort mode, particularly in braking or accelerating (longitudinal acceleration al unequal to zero). Similarly, at low vehicle speeds for instance, road safety will not be valued too highly, while for an occurring transverse acceleration aq the value gw will be chosen high (as compared to gh and gn) so that the roll movements of the vehicle superstructure that are created will be damped. A high vehicle speed and existing transverse acceleration aq creates a situation critical in terms of safety, in which low values of Pgr and k are favorable.

Finally, a certain number of parameter sets can be established in this way that are coordinated with specific situations of travel and travel maneuvers (characterized by value ranges of the state of travel variables such as vehicle speed, longitudinal and transverse acceleration). The number of sets, ranges of state of travel variables and the coordinations can then be adapted to a specific vehicle. Assured thereby is a high measure of adaptation possibilities to the desired characteristic of a vehicle.

While this invention has been described as having a preferred design, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A system for control of an undercarriage of a vehicle, the vehicle having a superstructure and an undercarriage, the undercarriage having at least two wheel units connected to the superstructure said wheel units subject to wheel load fluctuations, the undercarriage including adjustable means for affecting the sequences of movement of the undercarriage whereby the undercarriage selectively operates in one of a plurality of modes of undercarriage operation, the system comprising:

means for determining relative movements between the wheel units and the superstructure of the vehicle;

means for determining an amount of superstructure movement;

means for effecting a first mode of undercarriage operation defining a road safety operation of the undercarriage, said first mode of undercarriage operation dependent on said determined relative movements, said first mode of undercarriage operation controlling said adjustable means to minimize wheel load fluctuations;

means for effecting a second mode of undercarriage operation defining a travel comfort operation of the undercarriage, said second mode of undercarriage operation dependent on said determined relative movements, said second mode of undercarriage operation controlling said adjustable means to minimize superstructure movement;

means for effecting a third mode of undercarriage operation defining a standard predetermined operation of the undercarriage, said third mode of undercarriage operation controlling said adjustable means to maintain a predetermined adjustment characteristic of the undercarriage;

means for selecting one of said first mode effecting means, said second mode effecting means, and said third mode effecting means, dependent on said determined relative movements, and for controlling said adjustable means; and means for selecting one of said second mode effecting means, and said third mode effecting means, dependent on said amount of superstructure movement, and for controlling said adjustable means.

2. The system of claim 1, wherein said superstructure includes a shock absorber between each wheel unit and the superstructure, each said shock absorber having adjustable damping properties, said determining means comprising means for generating first signals indicative of said relative movements, said system further comprising:

means for linking each said first signals amongst themselves and producing resultants (zb', alphab', betab') representing superstructure movements such as heave, pitch, and roll velocities;

means for influencing at least two of the linkage resultants with magnitudes representing the state of travel such as steering, braking, and acceleration maneuvers; and means for linking the resultants of the means for linking each said first signals amongst themselves;

said selecting means utilizing said means for linking the resultants and second signals representing vertical superstructure movements at places of the superstructure where the shock absorbers of the wheels attach, for control of the shock absorber during minimization of the vehicle superstructure movements.

3. The system of claim 2, further comprising:

means for detecting signals of a steering angle sensor representing the transverse acceleration of the vehicle, said means for detecting signals of a steering angle sensor linked with said resultants (zb', alphab', betab') for obtaining the transverse acceleration amount of the vehicle; and means for detecting signals of wheel RPM sensors representing longitudinal acceleration of the vehicle, said means for detecting signals of wheel RPM are linked with said resultants (zb', alphab', betab') for obtaining the longitudinal acceleration amount of the vehicle.

4. A system for control of an undercarriage of a vehicle, the vehicle having a superstructure and an undercarriage, the undercarriage having at least two wheel units connected to the superstructure, the undercarriage including adjustable means for effecting the sequences of movement of the undercarriage, whereby the undercarriage is capable of a plurality of modes of operation, the system comprising:

means for generating first signals representing the relative movements between the wheel units and the superstructure of the vehicle;

means for effecting a first mode of undercarriage operation based on said first signals for defining a road safety operation of the undercarriage;

means for effecting a second mode of undercarriage operation based on said first signals for defining a travel comfort operation of the undercarriage;

means for effecting a third mode of undercarriage operation defining a standard predetermined operation of the undercarriage; and means for determining actual values of the wheel load fluctuations dependent on said first signals and for utilizing said actual values as selection criteria for selecting one of said first mode effecting means, said second mode effecting means, and said third mode effecting means, whereby said first mode effecting means minimizes wheel load fluctuations and said second mode effecting means minimizes superstructure movements.

5. The system of claim 4, wherein said selecting means further comprises means for comparing said actual values of the wheel load fluctuations with at least one first threshold value, said selecting means further utilizing said comparison as selection criteria for selection of one of said first, second, and third mode effecting means.

6. The system of claim 4, wherein said selecting means further comprises:

means for determining the movement of the superstructure based on the first signals; and means for comparing an amount of superstructure movement each with a threshold value, said selecting means utilizing said determination means and said comparison means as selection criteria for selection of one of said second and third mode effecting means.

7. The system of claim 6, wherein said first threshold values, said second threshold values, and said tuning parameters assume at least one of constant values and variables influencing the state of travel such as travel speed, longitudinal acceleration, transverse acceleration during steering, braking, acceleration maneuvers, and ambient temperature.

8. The system of claim 4, further comprising means for precalculating possible changes of the wheel load fluctuation as a function of possible changes of the undercarriage characteristic based on the first signals, said selecting means utilizing said possible changes as criteria for selecting whether the undercarriage characteristic is to be changed for minimization of the wheel load fluctuations.

9. The system of claim 8, further comprising:

means for analyzing as to the amount the actual values of the wheel load fluctuations and at least one of the possible change of the wheel load fluctuation and tuning parameters; and means for comparing the actual values of the wheel load fluctuations and at least one of the possible change of the wheel load fluctuation and tuning parameters;

said selecting means utilizing said comparing means as selection criteria for selection of one of said first, second, and third effecting means.

10. The system of claim 4, further comprising means for separately setting collective superstructure movements of heave, pitch, and roll, based on first signals wherein the superstructure movements are minimized.

\* \* \* \* \*